United States Patent
Hwang et al.

(12)

(10) Patent No.: US 6,622,369 B1
(45) Date of Patent: Sep. 23, 2003

(54) METHOD FOR ASSEMBLING AN ARMATURE OF A MOVING COIL TYPE LINEAR MOTOR

(75) Inventors: Ji Hyun Hwang, Kyungki-do (KR); Do Hyun Kim, Kyungki-do (KR); Hyun Joo Hwa, Kyungki-do (KR); Jang Sung Chun, Seoul (KR)

(73) Assignee: Mirae Corporation, Choongchungnam-Do (KR)

( * ) Notice: Subject to any disclaimer, the term of this patent is extended or adjusted under 35 U.S.C. 154(b) by 0 days.

(21) Appl. No.: 09/628,937

(22) Filed: Jul. 28, 2000

(30) Foreign Application Priority Data

Sep. 15, 1999 (KR) ........................................ 1999-39591
Aug. 13, 1999 (KR) ........................................ 1999-16696
Aug. 13, 1999 (KR) ........................................ 1999-33443

(51) Int. Cl.$^7$ ........................... H02K 15/04; H01F 7/121
(52) U.S. Cl. .............................. 29/596; 29/606; 29/732; 29/602.1; 156/297; 156/330
(58) Field of Search ......................... 29/596, 606, 732, 29/602.1; 156/297, 330; 310/12; 335/60

(56) References Cited

U.S. PATENT DOCUMENTS

| 4,246,694 A | * | 1/1981 | Raschbichler et al. ......... 29/596 |
| 5,464,494 A | * | 11/1995 | Bolte et al. .................. 156/330 |
| 5,565,718 A | * | 10/1996 | Takei ........................... 310/12 |
| 5,712,608 A | * | 1/1998 | Shimomura et al. .......... 335/60 |

FOREIGN PATENT DOCUMENTS

JP  4-338617  * 11/1992  ................ 29/606

* cited by examiner

Primary Examiner—A. Dexter Tugbang
(74) Attorney, Agent, or Firm—Rosenberg, Klein & Lee

(57) ABSTRACT

A method for assembling an armature of a moving coil type linear motor is provided comprising the steps of mounting a plurality of coils on to a coil alignment block; covering a top surface of the coil alignment block with an upper cover; wiring the coils with each other in a predetermined sequence; assembling an armature frame, a fixing cover and the coil alignment block to fix the coils, covering a bottom surface of the coil alignment block with a lower cover, and applying an epoxy adhesive to thereby fix the coils.

4 Claims, 15 Drawing Sheets

METHOD FOR ASSEMBLING AN ARMATURE OF A MOVING COIL TYPE LINEAR MOTOR

BACKGROUND OF THE INVENTION

1. Field of the Invention

The present invention relates to an armature of a moving coil type linear motor and a method for assembling the same.

2. Description of the Conventional Art

Figure 1:
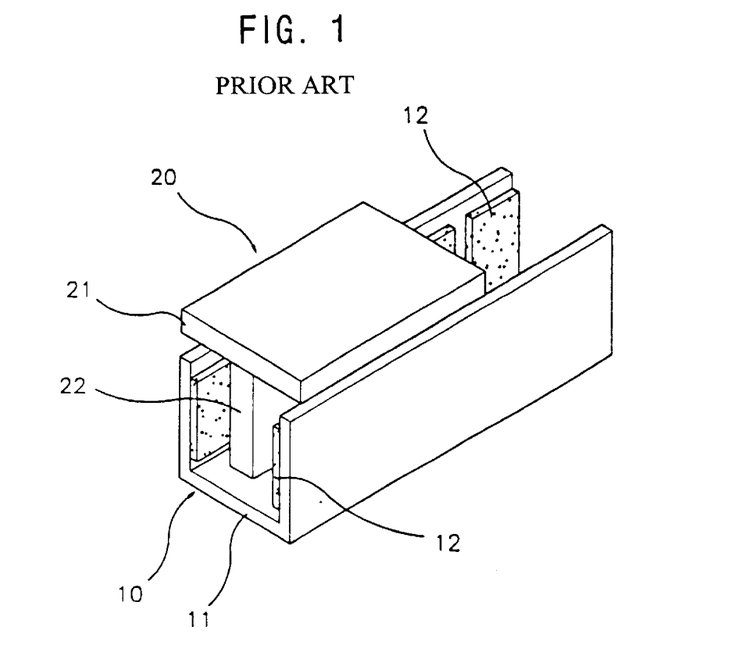
FIG. 1 is a perspective view of a conventional moving coil type linear motor.

FIG. 1 shows a perspective view of a moving coil type linear motor consisting of a movable element 20 and a stator element 10. The stator element 10 includes a U-shaped armature frame 11 and permanent magnets 12 arranged on inner surfaces of the armature frame 11. The movable element 20 disposed in the U-shaped armature frame 11 consists of a frame 21 and a coil block 22. When the coil block 22, formed by molded coils (not shown), is supplied with electric current, a thrust is generated between the coil block and the permanent magnets 12, causing the movable element 20 to be linearly moved.

Figure 2A:
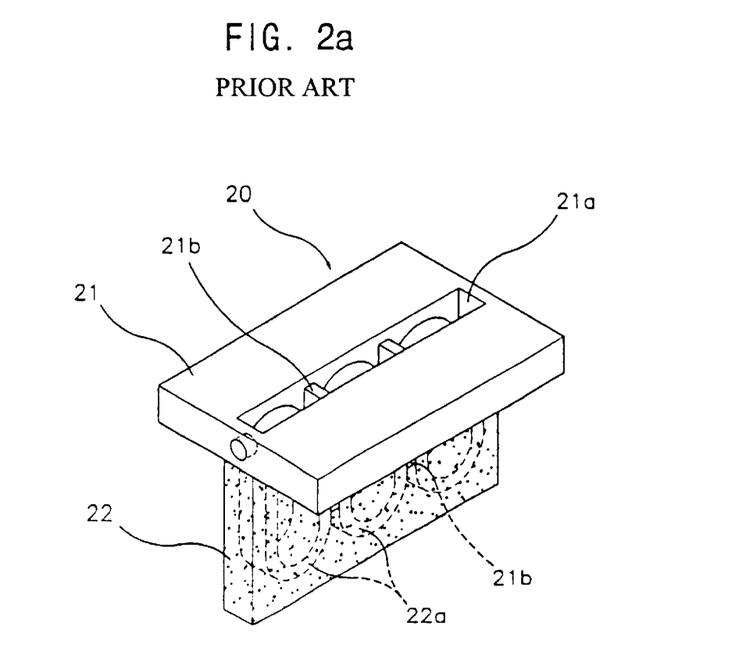
FIG. 2a is a perspective view of a conventional armature.

In order to couple the coil block 22 into the armature frame 21 as shown in FIG. 2a, there are formed a groove 21a in a central region of the armature frame 21, and spacers 21b located at a constant interval in the groove 21a. The coil block is formed as follows: the coils 22a are first placed between the spacers 21b; and the electrical wiring between the coils 22a and then the molding for forming the coil block 22 are sequentially conducted. The groove 21a and the spacers 21b are needed to regulate the pitch between the coils 22a and the height thereof in assembling the coils.

In the prior art described above, when the coreless coils 22a are assembled, the coil sizes are utilized to maintain the constant height of the coils, and therefore the precise assembling becomes required. Further, to maintain a constant pitch between the coils 22a, the machined spacers 21b are also needed.

The movable element 20 is assembled in such a manner that a linear movement of the movable element 20 along the axial direction of the stator element 10 becomes made possible. For this, it is required to wire and assemble the coils 22a at a constant interval, which will be described below with reference to FIG. 2b.

Figure 2B:
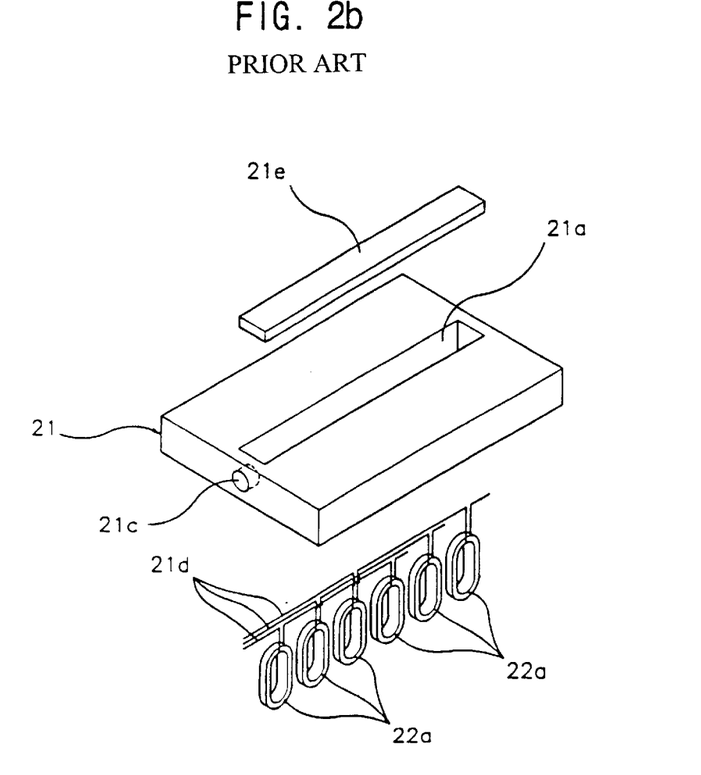
FIG. 2b is an exploded perspective view of a conventional armature.

As shown in FIG. 2b, the armature, i.e., movable element 20, includes the armature frame 21 and the armature coils 22a forming the coil block 22, wherein the armature frame 21 is formed with the groove 21a in a central portion thereof and has one side thereof formed with a hole 21c through which lead lines 21d are placed for external connection.

The armature coils 22a to be assembled into the groove 21a formed in the armature frame 21 are individually wound in numerous turns and then wired to the lead lines by soldering.

The electrically wired coils 22a are arranged and assembled at a predetermined spacing with respect to the armature frame 21, at the time of which an insulating member 21e is used for an insulation between the lead lines of the coils 22a. However, those procedures have the problems in that appropriate lengths of the lead lines 22a have to be maintained and insulation between the lead lines 22d are required.

Figure 3A:
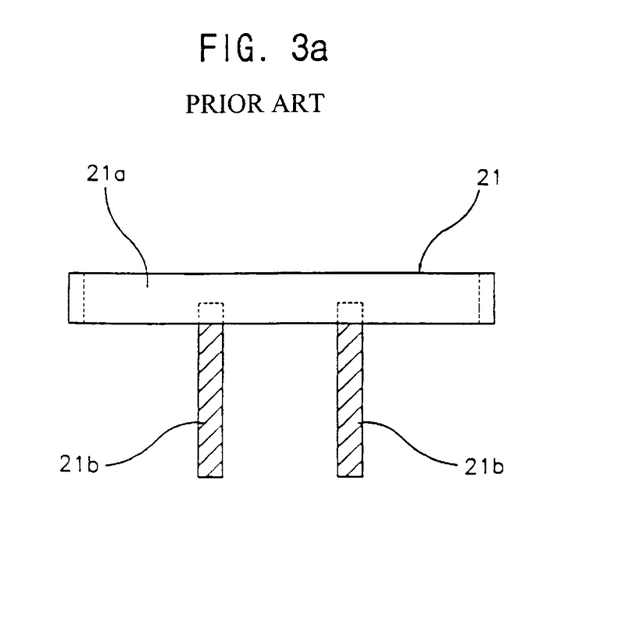
Figure 3B:
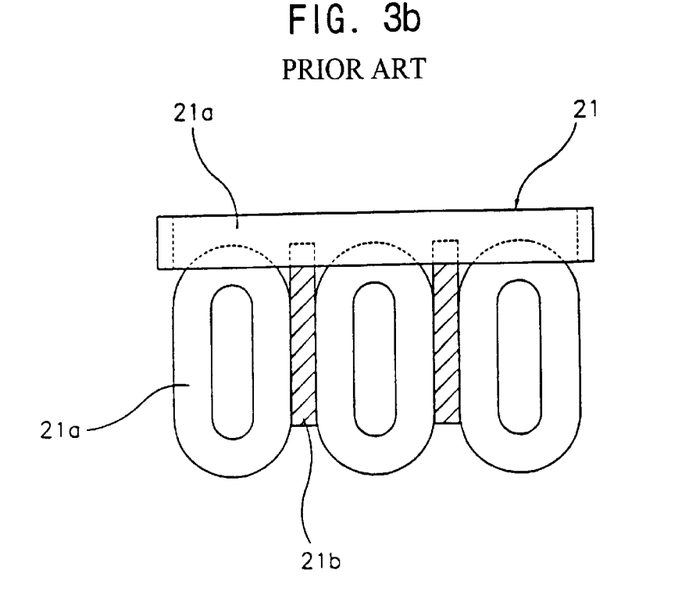
Figure 3C:
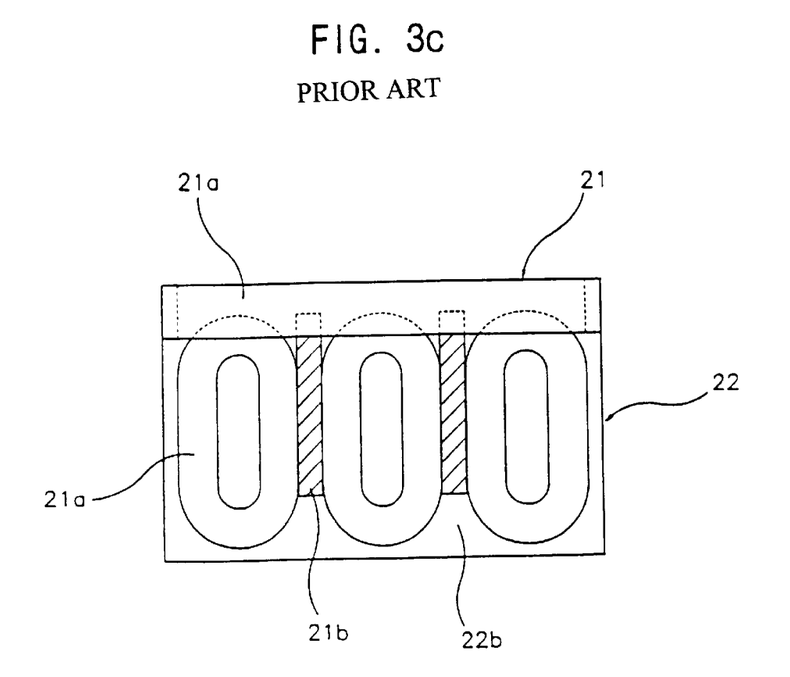

The detailed procedures of assembling the movable element 20 will be described with reference to FIGS. 3a–c. As shown in FIGS. 3a and 3b, at first, the armature frame 21 and the spacers 21b are assembled together, to which the coils 22a are coupled. Following these procedures, the coils 22a are wired to the lead lines. Next, as shown in FIG. 3c, the coils 22a are molded 22b to form the coil block 22.

In case of coupling the coils to the prior art armature frame 21 assembled with the spacers 21b, the groove 21a for assembling the coils has to be sealed. This makes it difficult to mold.

SUMMARY OF THE INVENTION

Therefore, it is an object of the present invention to provide a method for assembling an armature in which inner holes of coils are used to maintain a constant pitch between the coils and height of the coils, whereby a coil block can be readily assembled.

Another object of the present invention is to provide an armature making it possible to easily insulate lead lines of armature coils to each other and to readily perform the wiring of the coils, by using a printed circuit board.

Another object of the present invention is to provide an armature having two layered structure of armature frame facilitating to perform the wiring and molding of the coils.

According to one aspect of the present invention, there is provided a method for assembling an armature of a moving coil type linear motor, the method comprising the steps of: mounting coils, each having an inner hole, into a coil alignment block; covering a top surface of the coil alignment block with an upper cover so as to maintain a constant height of and pitch between the coils, and wiring the coils with each other; assembling a fixing cover and the coil alignment block to fix the coils; covering a bottom surface of the coil alignment block with a lower cover; and adhering with an epoxy adhesive the coils mounted onto the armature frame, and thereby fixing the coils.

According to another aspect of the present invention, there is provided a linear motor comprising: an armature frame; a plurality of armature coils, each coil having a plurality of leads; and a printed circuit board for use in the wiring of the leads and which is incorporated into the armature frame.

According to another aspect of the present invention, there is also provided a moving coil type linear motor comprising: a lower frame having therein a groove for assembling armature coils and integrally formed with spacers at a constant interval along the groove therein; and an upper frame over the lower frame and for sealing the groove at the time of molding the armature coils.

BRIEF DESCRIPTION OF THE DRAWINGS

FIGS. 3a to 3c are cross-sectional views showing the assembling procedures of the armature shown in FIG. 2a.

DETAILED DESCRIPTION OF THE INVENTION

According to one aspect of the present invention, the following describes a method for assembling an armature, with reference to the accompanying drawings.

Figure 4:
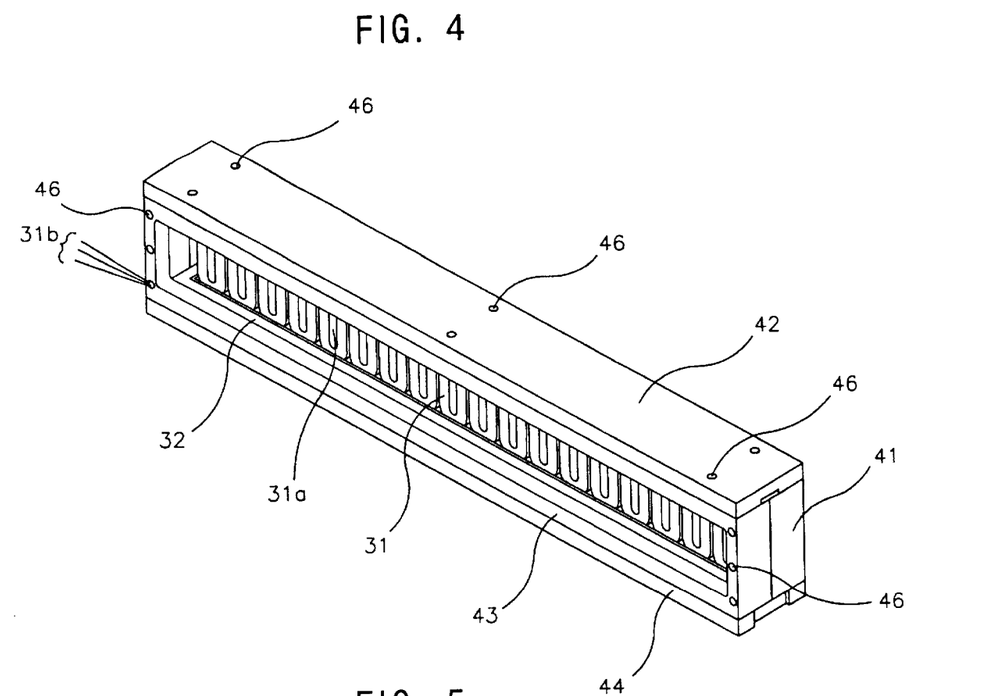
FIG. 4 is a perspective view of an armature assembly.
Figure 5:
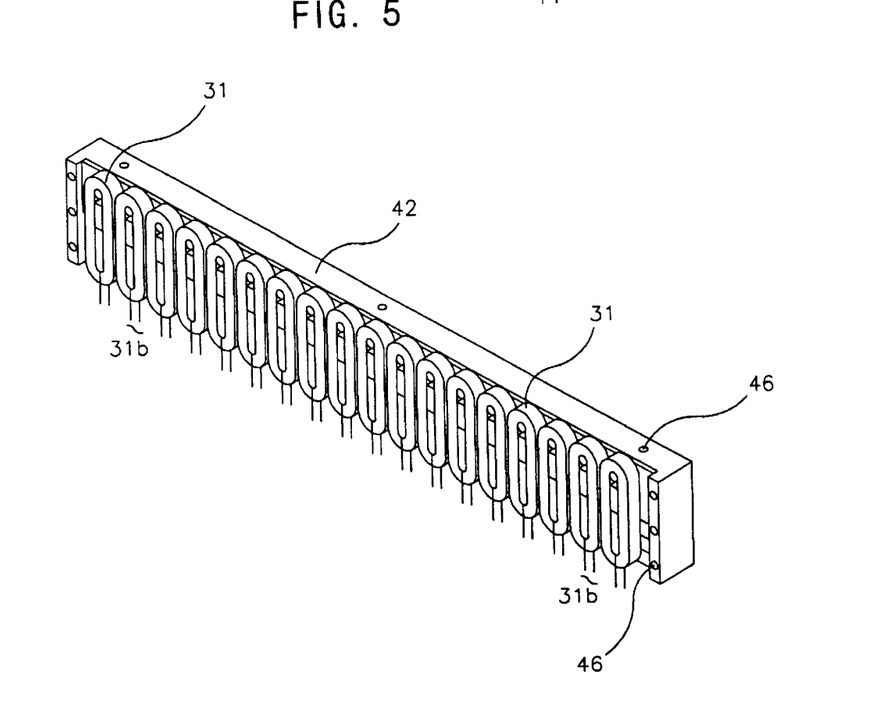
FIG. 5 is a perspective view of coils shown in FIG. 4.
Figure 6:
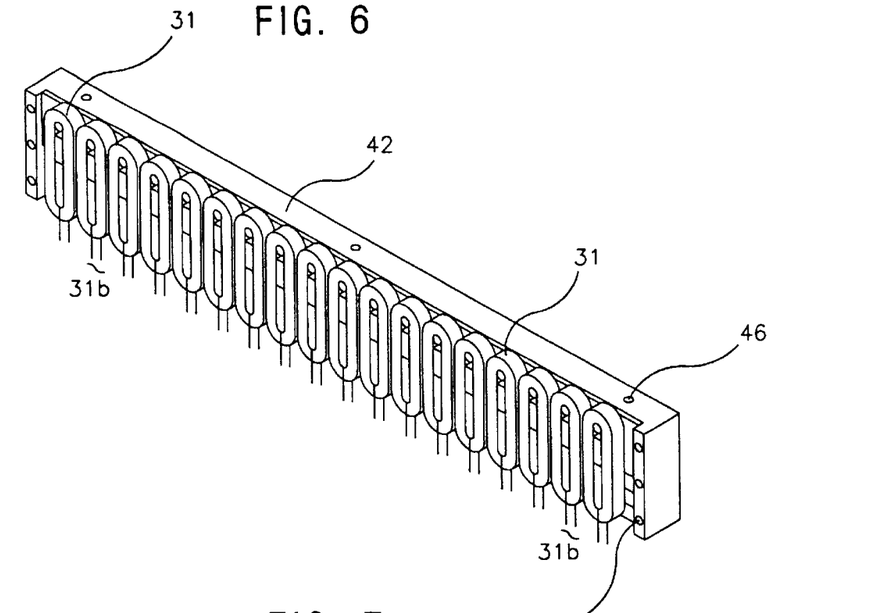
FIG. 6 is a perspective view of the coil alignment block of FIG. 3, showing the coil alignment procedure.

FIG. 4 is a perspective view of an armature assembly formed by the following procedures comprising mounting coils 31, each having an inner hole 31a, into a coil alignment block 41, covering a top surface of the coil alignment block 41 with an upper cover 42 so as to maintain a constant height of and pitch between the coils 31, and wiring the coils with each other, assembling a fixing cover 43 and the coil alignment block 41 to fix the coils, covering a bottom surface of the coil alignment block 41 with a lower cover 44, and adhering with an epoxy adhesive 45 the coils mounted onto the armature frame 32, and thereby fixing the coils 31.

The detailed procedures of assembling the armature will be described. At first, a plurality of coils 31 each having an inner hole 31a are coupled to a coil alignment block 41, shown in FIG. 7, having a plurality pairs of coil height regulation pins 41a and coil alignment projections 41b, the pairs being arranged at a constant spacing therebetween. To the inner hole 31a of each coil 31 is inserted one pair of pin 41a and projection 41b, whereby the coils are coupled to the coil alignment block 41.

Figure 7:
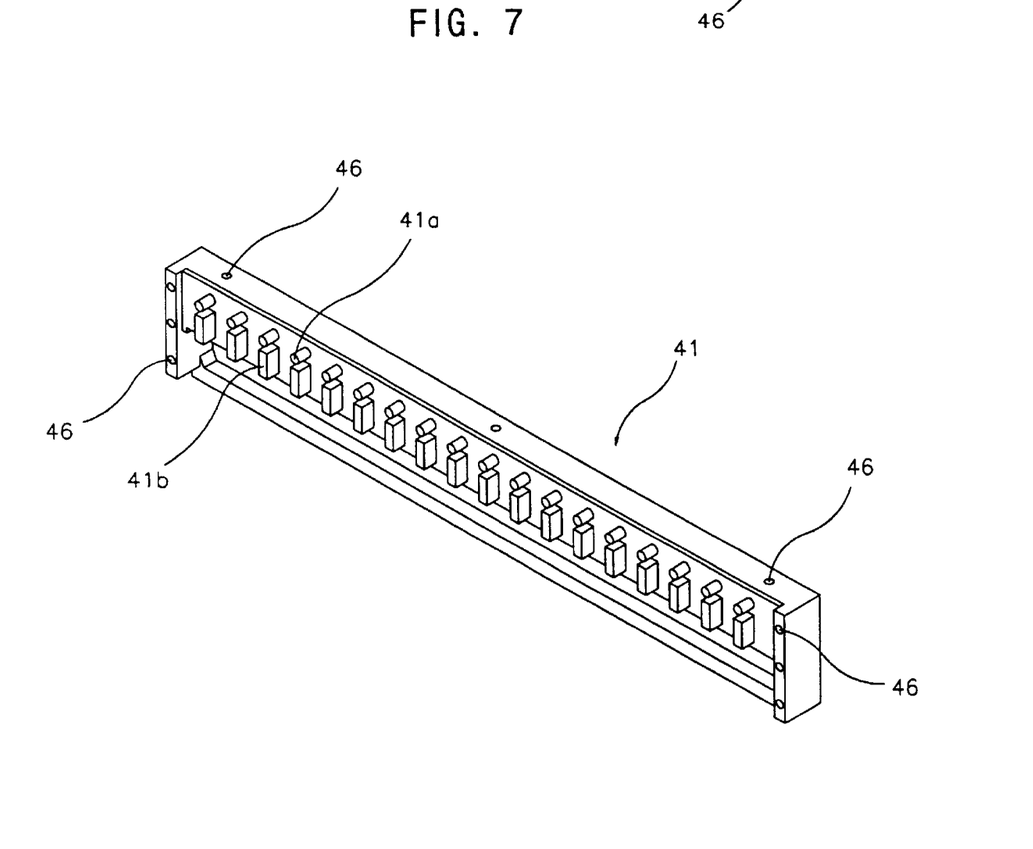
FIG. 7 is a perspective view of the coil alignment block of FIG. 6.

The coil height regulation pin 41a has a circular cross section. That is, the pin 41a is formed such that upper semi-circular portion of the inner hole 31a of the coil 31 abuts against the circular pin 41a, and thereby results in an easy alignment of the coils to each other. The coil alignment projection 41b has a rectangular cross section so as to maintain a constant pitch between the coils mounted into the coil alignment block 41. The rectangular-shaped coil alignment projections 41b prevent the mounted coils 31 from being deformed by external force.

Figure 8:
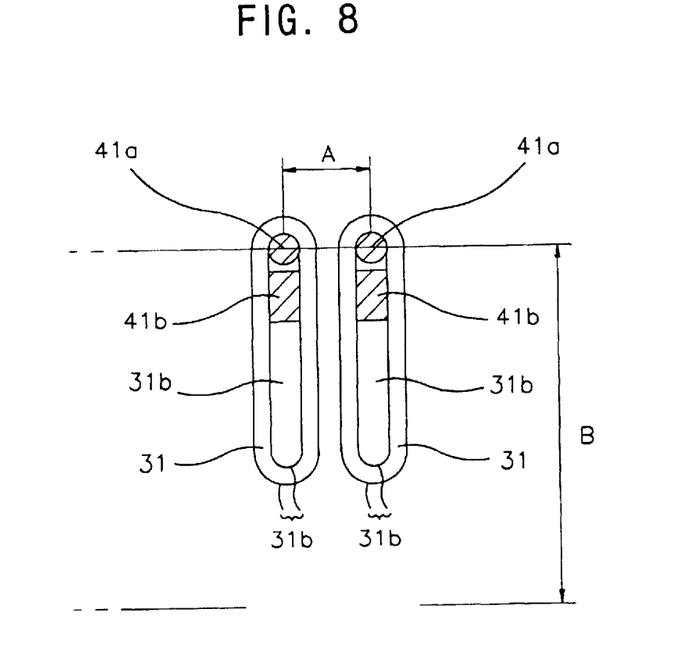
FIG. 8 is an enlarged view showing main portions of the coil alignment block of FIG. 4.

Referring to FIG. 8, the height of the coils and the pitch between the coils are maintained by means of the coil height regulation pins 41a and the coil alignment projections 41b. That is, the spacing A between two contiguous pins 41a permits a constant pitch between the coils 31, and a constant height B maintains a constant height of the coils.

Figure 9:
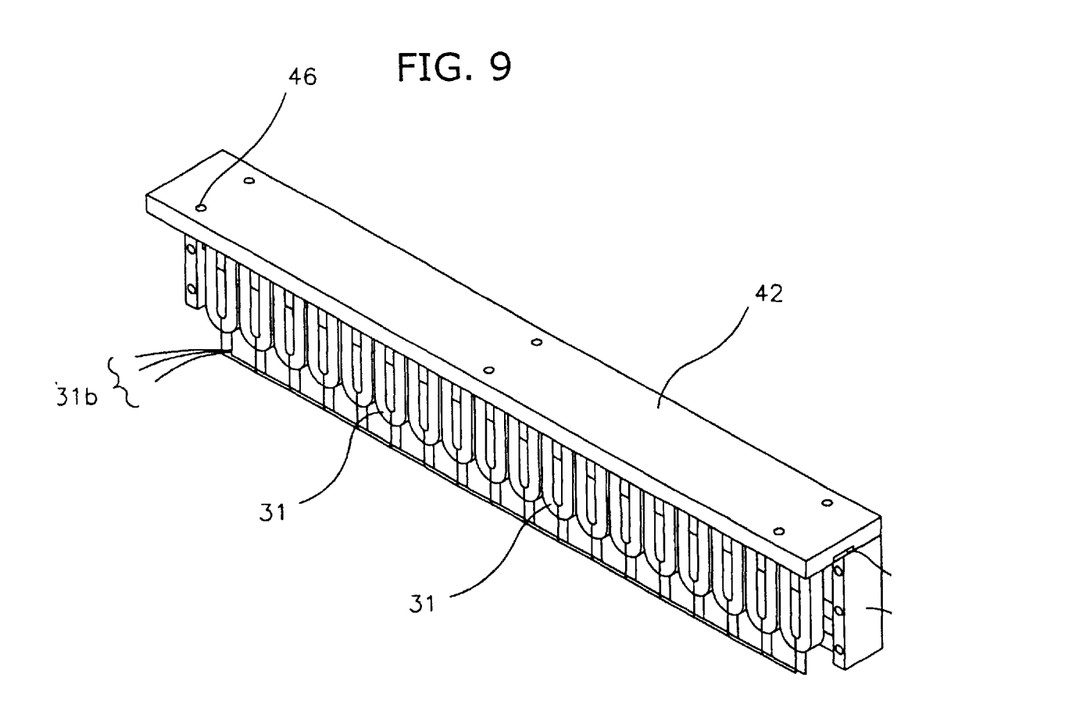
FIG. 9 is a perspective view showing the coil alignment block shown in FIG. 4, when said block and an upper cover are assembled together.

Following the coils being aligned using the coil alignment block 41, an upper cover 42 is assembled as shown in FIG. 9. FIG. 9 also shows the electrically wired coils to each other, after the upper cover 42 and the aligned coils 31 are coupled to each other.

Figure 10A:
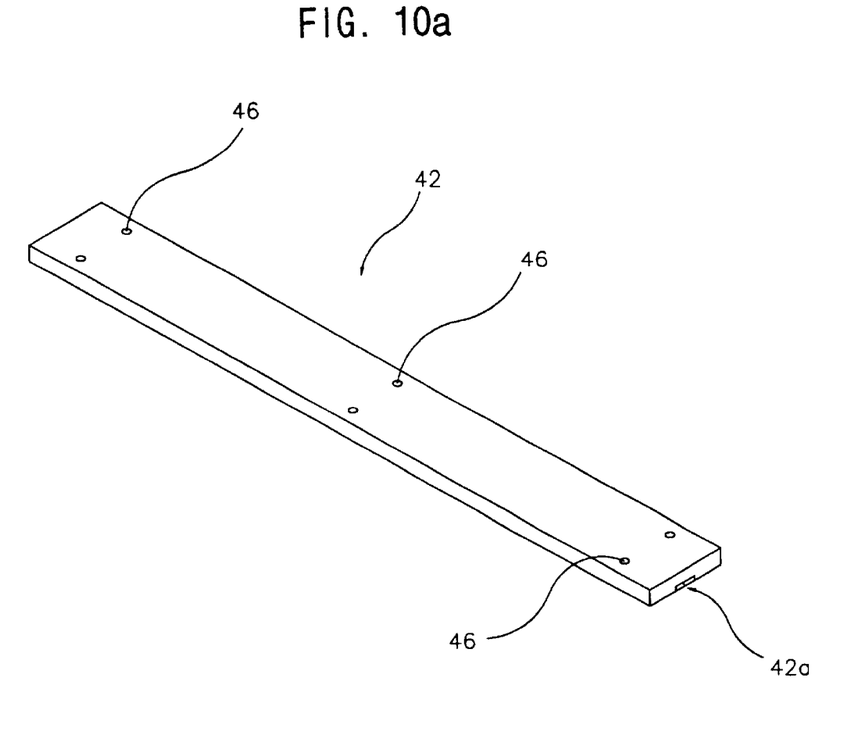
FIGS. 10a and 10b are perspective views of the upper cover shown in FIG. 9.
Figure 10B:
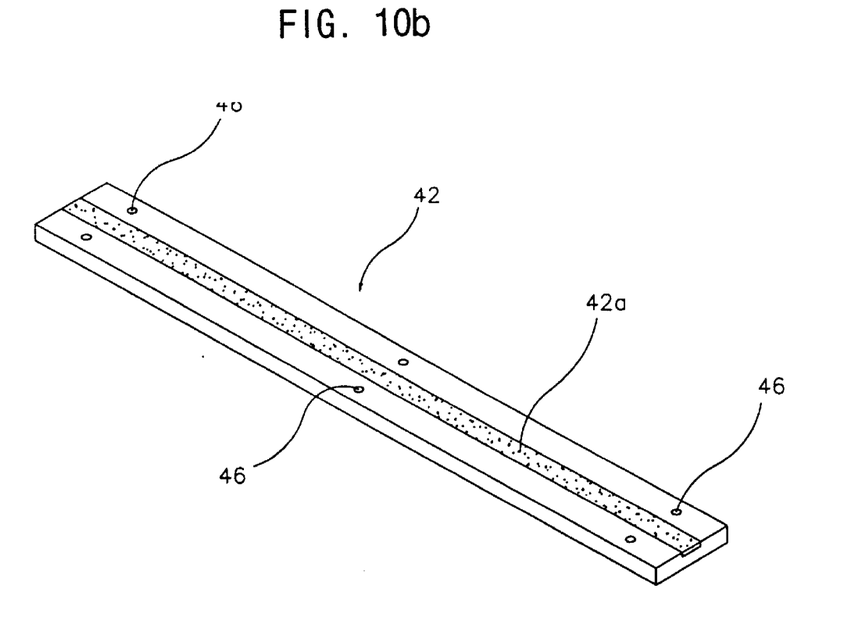

Reference numeral 46 denotes holes through which fastening elements, such as a bolt, are inserted so that the cover 42 is secured to the coil alignment block 41. It is noted that, as shown in FIGS. 10a and 10b, the upper cover 42 is also provided thereon with elastic material 42a which may be, for example, a soft rubber material and which serves to apply downward constant elastic force to the coils 31.

The coils 31 interposed between the elastic material and the coil height regulation pins 41a can be aligned with their constant heights.

Figure 11:
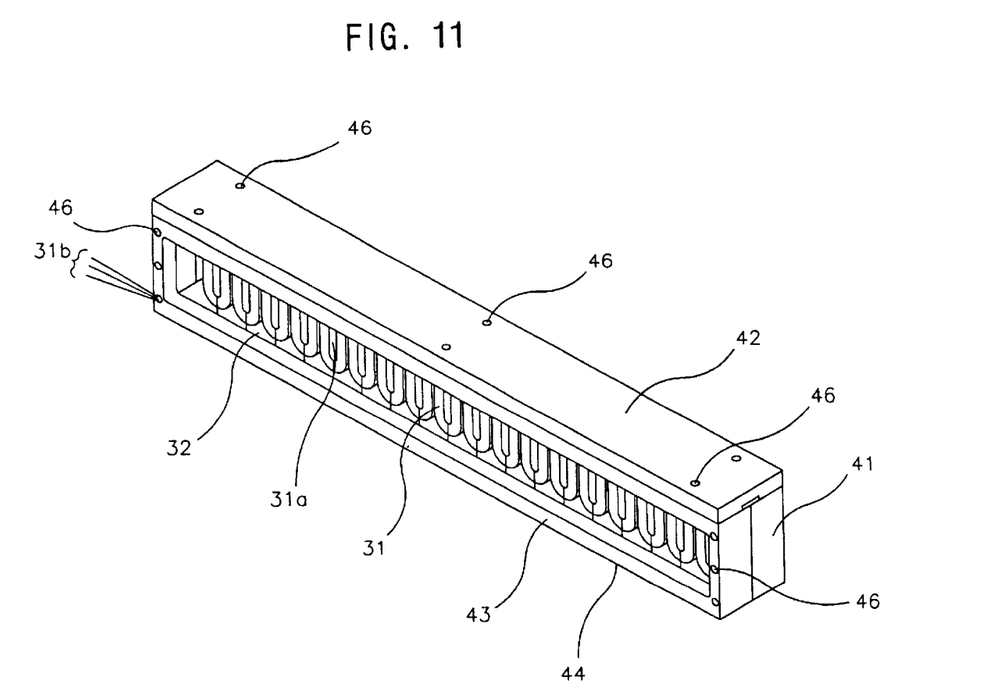
FIG. 11 is a perspective view showing the coil alignment block shown in FIG. 4, when said block and a fixing cover are assembled together.
Figure 12:
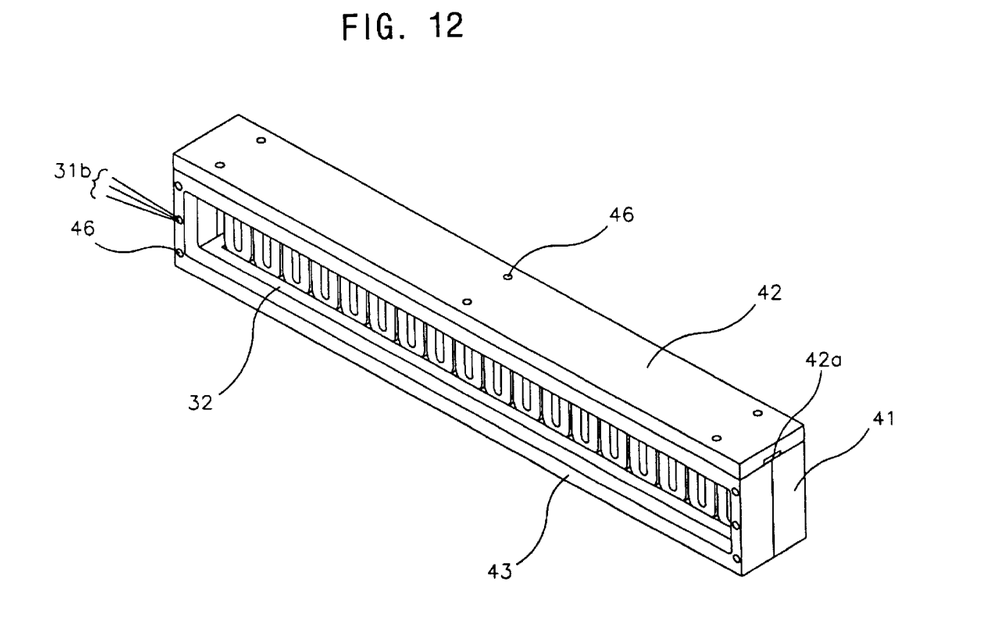
FIG. 12 is a perspective view showing the coil alignment block shown in FIG. 4, when the said block, an upper cover and a lower cover are assembled together.
Figure 13:
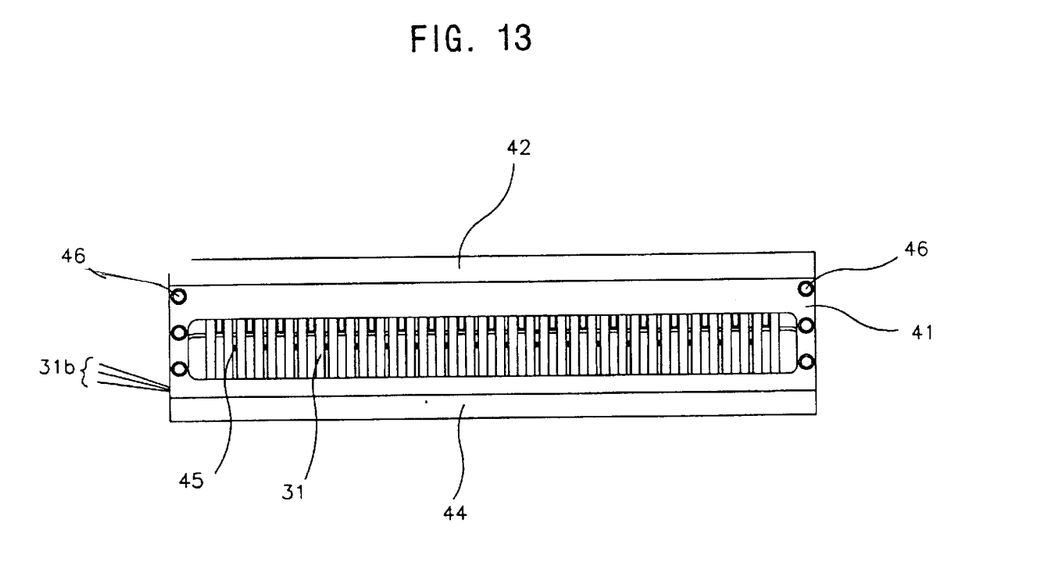
FIG. 13 is a front view of the coil alignment block, with epoxy adhesive applied between the coils.

With the aid of the upper cover 42, the coils 31 are aligned with their constant heights, and then leads 31b are used to wire the coils 31 to each other. The sequential wiring of the leads 31b to the coils depends on three phase AC power U, V, W. Following this, the coil alignment block 41 and a fixing cover 43 are assembled together to firmly secure the coils, as shown in FIG. 11. Subsequently, as shown in FIGS. 12 and 13, the following procedures are sequentially performed that comprise coupling the armature frame 32 and lower parts of the coils, assembling the coil alignment block 41 and a lower cover 44, and adhering and fixing with epoxy adhesive 45 the coils to the armature frame 32 to be described below. Thus, the assembling of the coils 31 and the armature frame 32 is completed.

In the procedure where the coils coupled to be armature frame 32 are adhered and fixed with epoxy adhesive, the epoxy adhesive 45 is applied between the coils and the armature frame 32. After the adhesion of the coils 31 to the armature frame 32 with the epoxy adhesive 45 and the laps of a certain time to harden, the coils are firmly secured to the armature frame 32.

Figure 14:
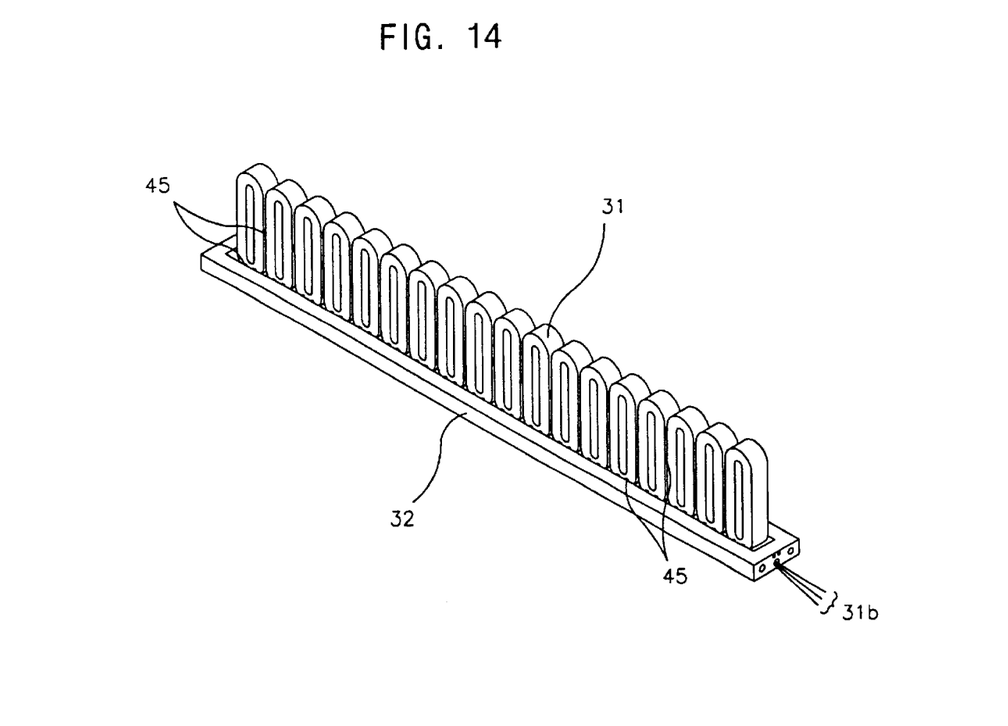
FIG. 14 is a perspective view of an armature when a coil alignment block is removed.

After the epoxy resin is hardened, the assembled armature is detached to leave the coils which are firmly secured and aligned to have a constant height and pitch of the coils, as shown in FIG. 14. Thereafter, the assembling of the armature is completed through the molding of the coils 31.

The use of such a coil alignment block allows the constant height of and pitch between the coils to be maintained, and thereby reduces the torque ripple. Also, it is possible to arrange the coils perpendicular to the armature frame. Further, since the armature frame can be assembled without the need to use the spacers, the assembling steps may be further simplified to thereby offer the assembling efficiency.

Next, according to another aspect of the present invention, the following describes an armature facilitating insulation between lead lines of armature coils, as well as the wiring of the lead lines of the armature coils.

Figure 15:
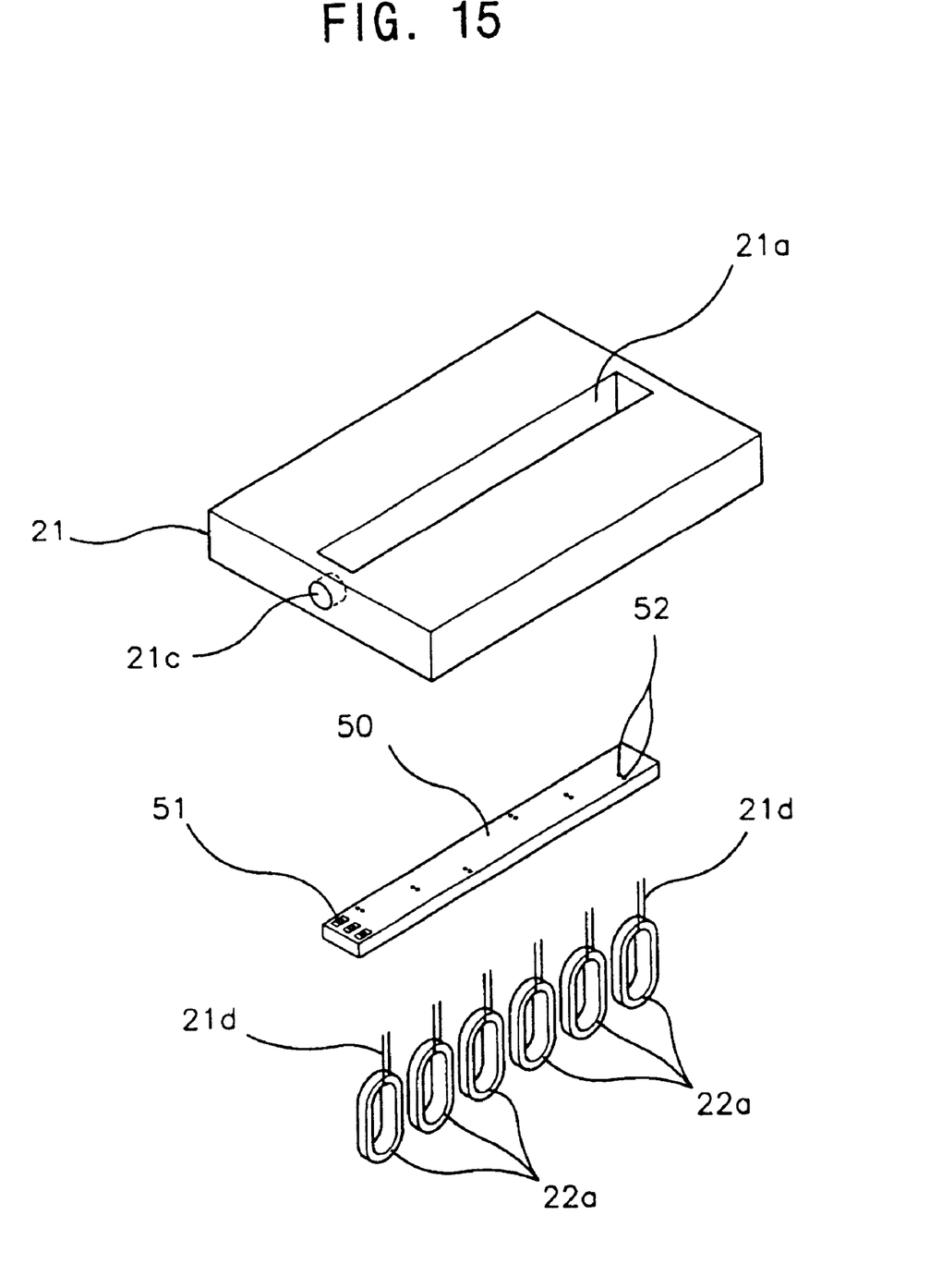
FIG. 15 is an exploded perspective view of an armature according to the present invention.

FIG. 15 shows an exploded perspective view of an armature. It is shown to include an armature frame 21, a plurality of armature coils 52d having a plurality of lead lines 52b, a printed circuit board 50 to which the lead lines 52b are wired and which is mounted into the armature frame 21.

The detailed structure of the present invention will be described.

The armature of the linear motor consists of the armature frame 21 and armature coils 52d forming a coil block. The armature frame 21 is formed with a groove 21a and a hole 21c. Each of the armature coils 52d has a plurality of lead lines 52b for electrically connecting three phase electric power U, V, W.

The coils 52b are arranged at a regular interval on the armature frame 21. The plural lead lines 52b are needed for electrical connection between three phase electric power U, V, W and respective coils 52d, wherein the electrical connection may be made possible by using the PCB 50.

Figure 16:
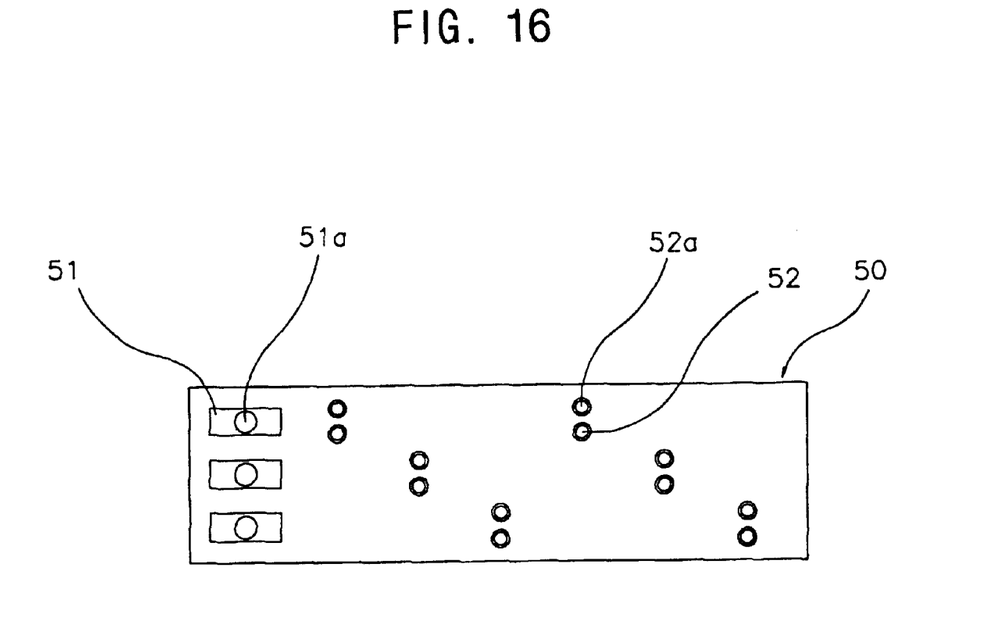
FIG. 16 shows a rear portion of the a PCB shown in FIG. 3.

On a rear surface of the PCB 50 are formed pads 51 for connecting three phase power U, V, W by soldering, a central portion of each pad being formed with a via hole 51a, respectively. On a right side from the pads 51, there are disposed a plurality of another pads 52 each having a via-hole at a central portion thereof and to which the lead lines 52b are wired for electrical connection to each other, respectively.

Figure 17:
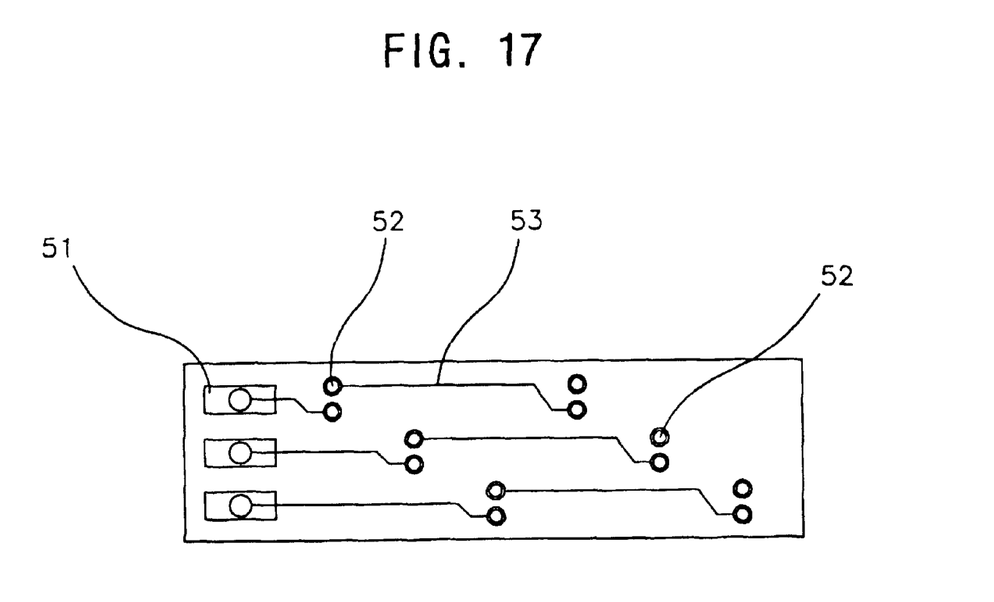
FIG. 17 shows a bottom of a PCB shown in FIG. 3.

For direct connections between the via holes 51a, 52a of the respective pads 51, 52, there are provided traces 53 on the rear surface of the PCB 50, as shown in FIG. 17. The traces connecting the via-holes result in electrical connection between the coils 22a.

Figure 18:
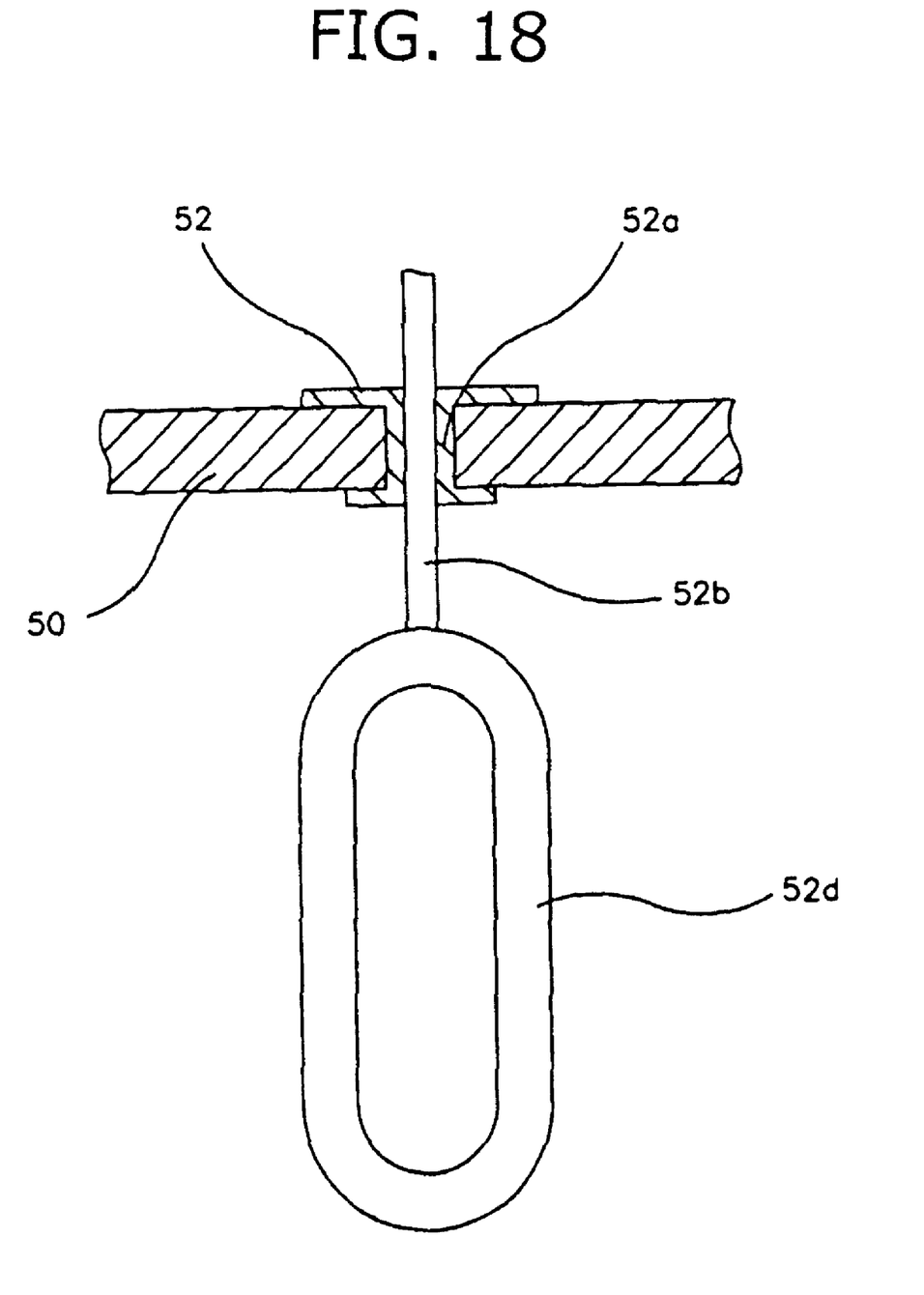
FIG. 18 shows a view when lead lines of coils and a PCB are assembled according to the present invention.

FIG. 18 shows the resulting connection between the pad 52 having the via-hole 52a and the PCB having the traces thereon and the coils 52d.

As shown in FIG. 18, the electrical wiring of the coil 52d can be fast and readily made by, inserting the lead 52b into the via-hole 52a, and thereafter electrically connecting it to the pad 52 by, for example, soldering. The via-hold 52a may be arranged at a regular interval such that the regular interval between the via-holes 52a constantly maintains the interval between the coils 22a.

The use of the PCB 50 permits the constant interval between the armature coils 22a, as well as easy wiring of the coils 22a, thus resulting in a shortened assembling time of the armature. The wired connection between the coils 52d and the leads 52b by using the PCB 50 facilitates an insulation between the lead 52b of the coils 52d, and results in an easy insulation of the armature.

After the coils 52d are wired to the PCB 50, the PCB 50 is mounted into the armature frame 21. The PCB 50 is inserted into the groove formed in the armature frame 21 and assembled, and the assembling of the armature is thereby completed.

As described above, the present invention advantageously provides the armature which facilitates insulation between the lead lines of the coils and the wired connection between the lead lines by using the PCB, when the armature of the linear motor is wired, Next, the following describes an armature providing easy wirings and molding of armature coils.

Figure 19:
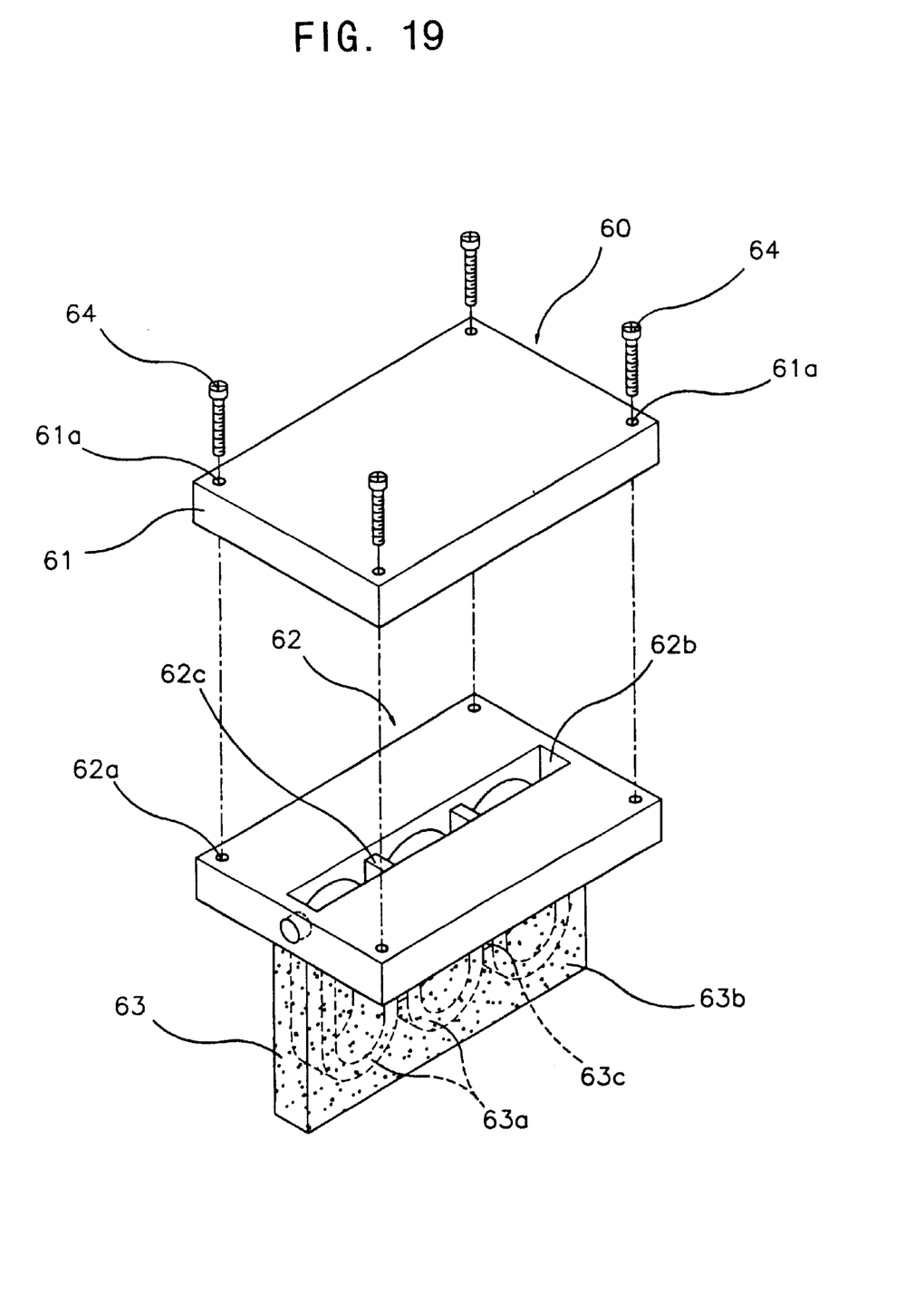
FIG. 19 is an exploded perspective view of an armature according to the present invention.

FIG. 19 shows an exploded perspective view of an armature according to another aspect of the present invention. It is shown to include: a lower frame 62 integrally formed with spacers 62c at a constant interval therebetween along a groove 62b for assembling armature coils 63a; and an upper frame 61 on the lower frame 62, for closely covering the groove in the lower frame at the molding of the armature coils 63a.

The detailed structure of the present invention will be described.

For two layered structure of the armature frame, the upper frame 61 has at each corner thereof screw holes 61a, each hole being formed corresponding to screw holes 62a formed at each corner of the lower frame 62. The upper and lower frames 61, 62 can be securely fastened to each other by means of the screws 64 inserted through the respective aligned screw holes 61a, 62a.

The lower frame 62 to which the upper frame 61 is securely coupled is formed with the groove 62b for facilitating to perform the assembling and electrical wiring of the armature coils 63a. Inside of the groove, there are provided the spacers 62c at a constant interval. The spacers 62c maintains the constant spacing between the armature coils 63a at the molding of the armature coils 63a.

The assembling procedures of the armature thus constructed will be described, with reference to the accompanying drawings.

Figure 20A:
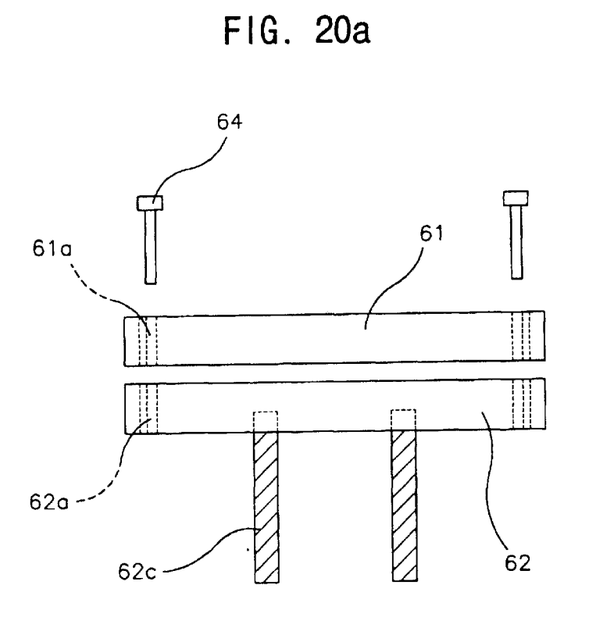
FIGS. 20a to 20c are cross-sectional views showing procedures of assembling an armature shown in FIG. 19.
Figure 20B:
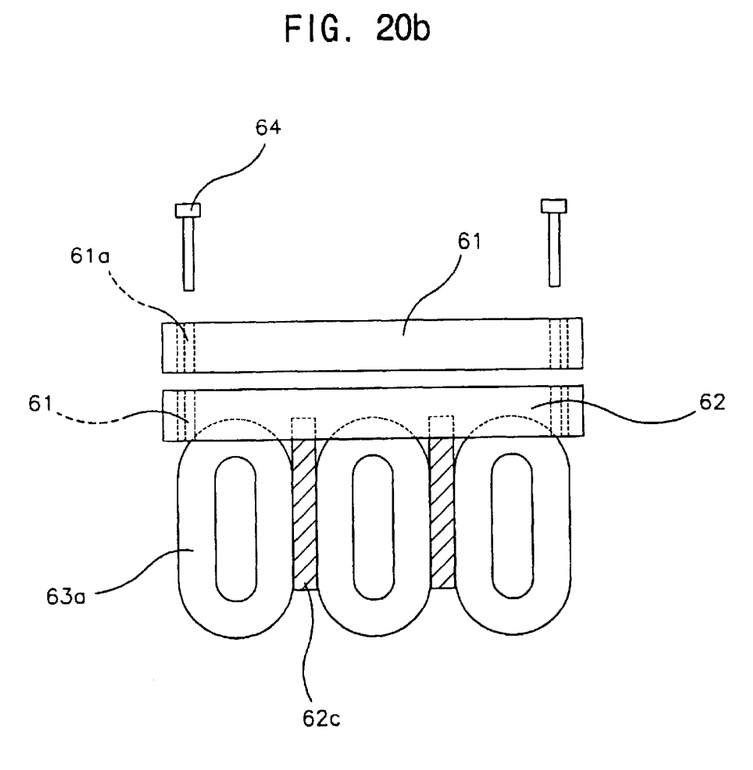
Figure 20C:
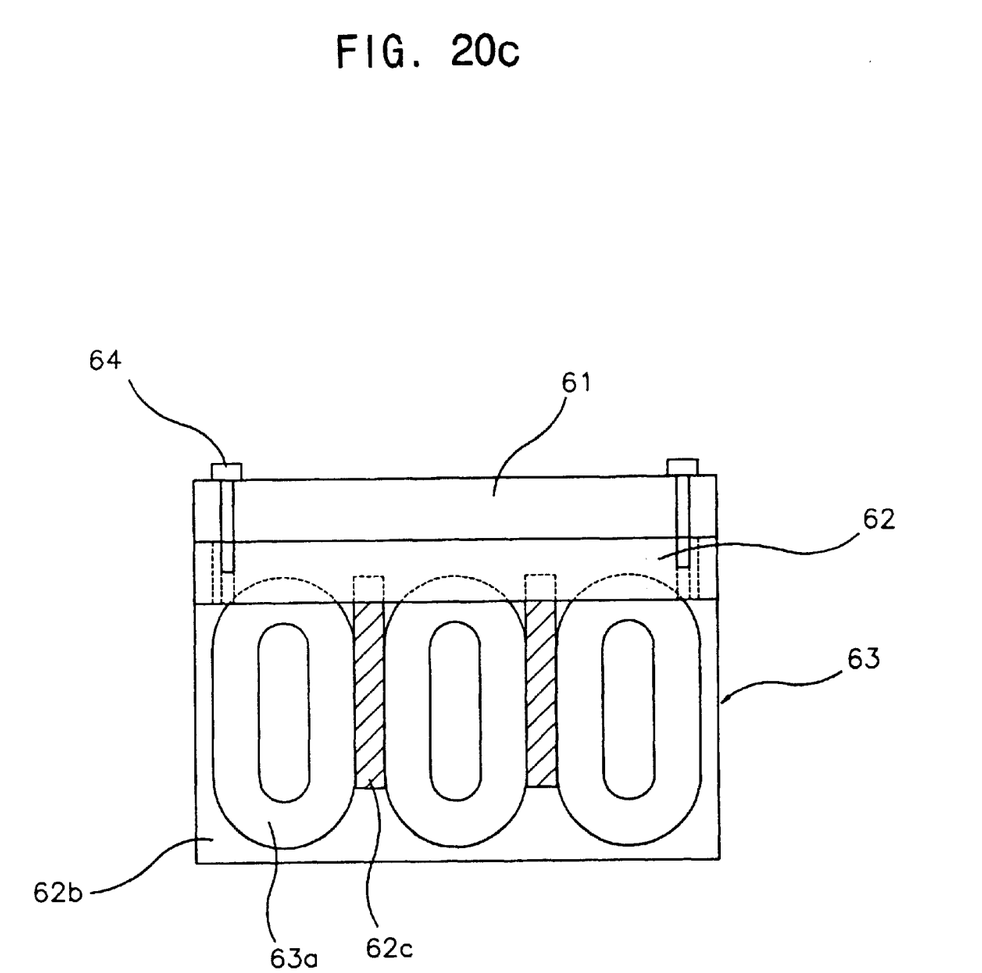

The armature coils 63a and the lower frame 62 are assembled together, as shown in FIG. 20b, before the upper and lower frames 61, 62 are coupled to each other, as shown in FIG. 20a. The armature coils 63a are assembled and electrically wired through the groove 62b formed in the lower frame 62, ad then molded, as shown in FIG. 19.

The upper frame 61 is coupled to the lower frame 62 before the armature coils 63a are molded. After the screw holes 61a of the upper frame 61 and the screw holes 62a of the lower frame 62 are aligned, the screw 64 are fully tightened in such a manner that the upper and lower frames 61, 62 are assembled to be closely contacted with each other. After the frames are assembled, the resultant is molded.

The armature coils 63a may be molded with, for example, epoxy resin 63b of an excellent insulating material. Following the coupling of the two frames, the molding is performed. It prevents leakage of the epoxy resin 63b through the groove 62b, thus resulting in a fully sealed state. This offers an easy and secure mold of the armature coils 63a.

With the two layered structure of the armature frame, the upper and lower frames 61, 62 can be readily assembled and the molding of the armature coils 63a to the upper frame 61 can be improved.

What is claimed is:

1. A method for assembling an armature of a moving coil type linear motor, the method comprising steps of:

(a) providing a coil alignment block having a plurality of coil mounting positions, each of the coil mounting positions having a coil alignment projection and a corresponding height regulation pin;

(b) mounting a plurality of coils on the coil alignment block at respective ones of the plurality of coil mounting positions, each of the coils having a closed contour with an inner hole through which the coil alignment projection and the corresponding height regulation pin of the respective coil mounting position is received;

(c) covering a top surface of the coil alignment block with an upper cover adapted to span the plurality of coils, the upper cover applying an elastic force to each of the plurality of coils directed to laterally engage an inner surface of the inner hole thereof against the corresponding height regulation pin of the coil alignment block;

(d) wiring the coils with one another in a predetermined sequence;

(e) coupling an armature frame to lower portions of the coils;

(f) assembling a fixing cover to the coil alignment block to fix the plurality of coils in position;

(g) covering a bottom surface of the coil alignment block with a lower cover; and (h) applying an epoxy adhesive between the coils and the armature frame to thereby firmly affix the coils to the armature frame.

2. The method as defined in claim 1, wherein each of the coil height regulation pins have a circular cross-section.

3. The method as defined in claim 1, where the step of covering a top surface of the coil alignment block includes the step of providing the upper cover with an elastic material mounted thereon.

4. The method as defined in claim 1, where the step of applying an epoxy adhesive includes the step of applying epoxy adhesive between the coils.

* * * * *